Dec. 3, 1935.  H. C. SCHAPER  2,022,981
AUTOMATIC WEIGHT INDICATING SCALE
Filed July 26, 1932  3 Sheets-Sheet 1
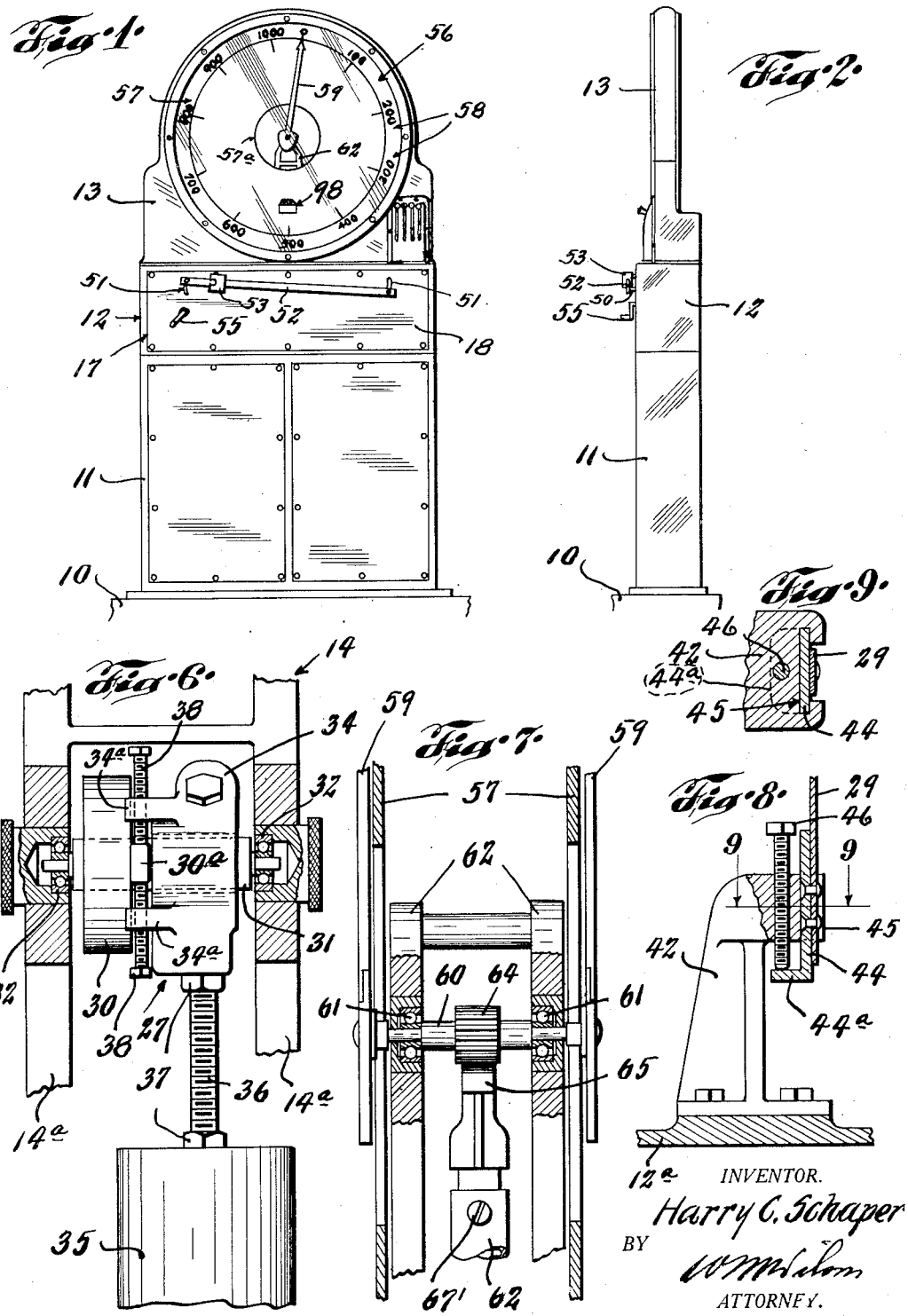
INVENTOR.
Harry C. Schaper
BY
ATTORNEY.

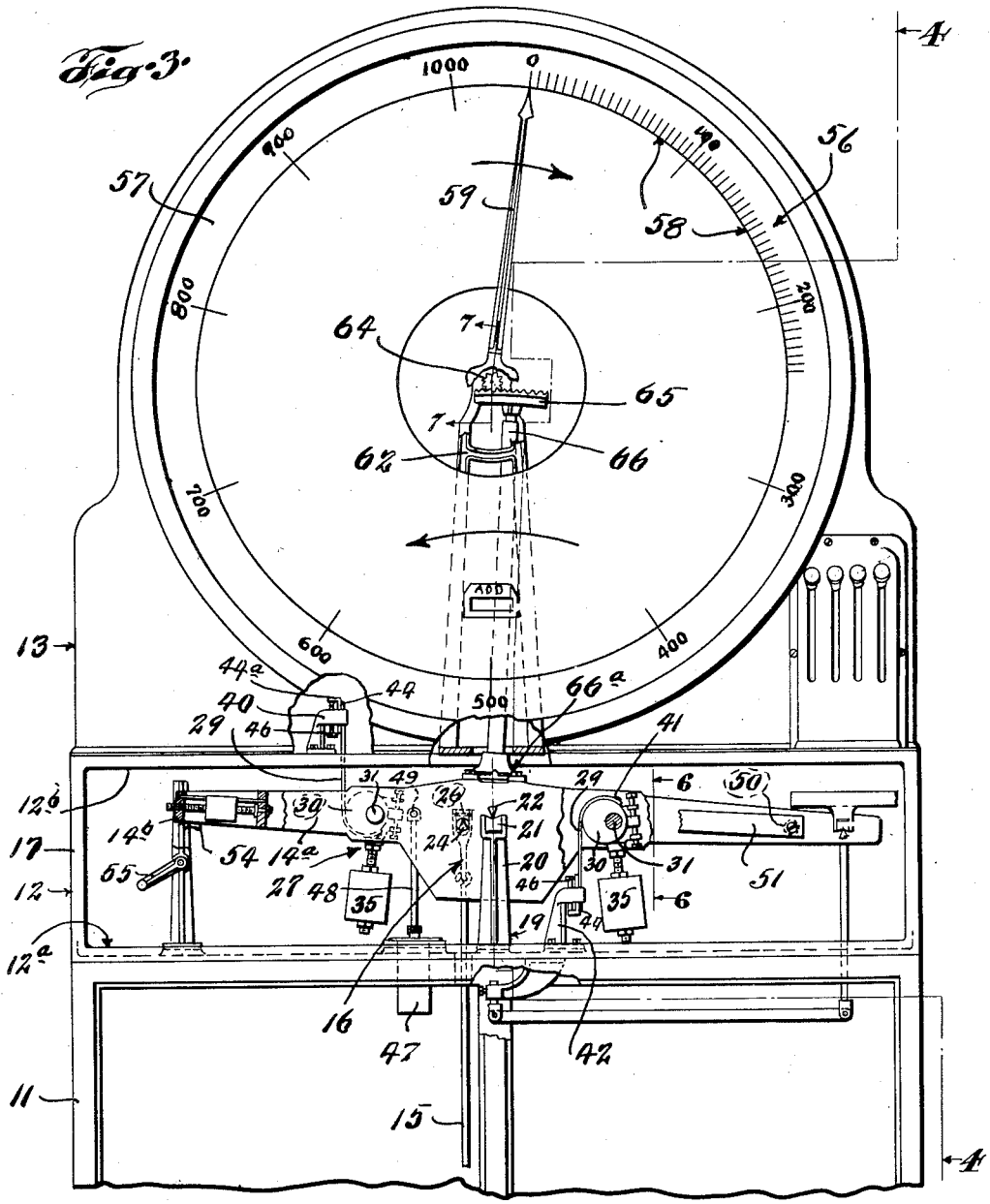

Dec. 3, 1935. H. C. SCHAPER 2,022,981
AUTOMATIC WEIGHT INDICATING SCALE
Filed July 26, 1932 3 Sheets-Sheet 3
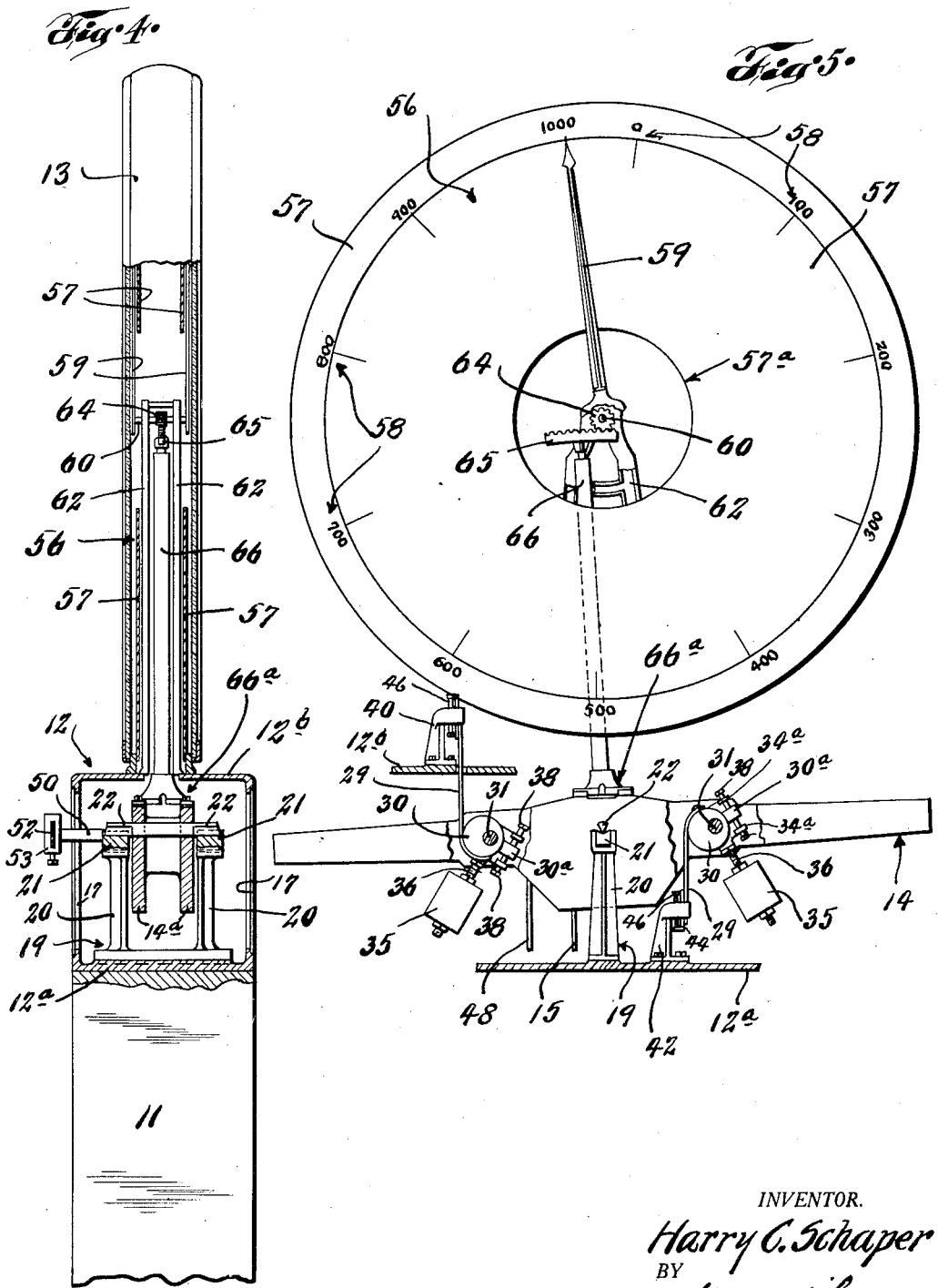
INVENTOR.
Harry C. Schaper
BY
*[signature]*
ATTORNEY.

Patented Dec. 3, 1935

2,022,981

UNITED STATES PATENT OFFICE 2,022,981

AUTOMATIC WEIGHT INDICATING SCALE

Harry C. Schaper, Buffalo, N. Y., assignor, by mesne assignments, to International Business Machines Corporation, New York, N. Y., a corporation of New York Application July 26, 1932, Serial No. 624,730

10 Claims. (Cl. 265—62)

This invention relates to new and useful improvements in automatic weight indicating scales.

Heretofore automatic weighing scales employing pendulum weights to offset loads have had their pendulum levers operated by a load-actuated lever and mounted independently thereof in the dial housing. This load-actuated lever is commonly known as a bench lever or beam lever. The pendulum levers are levers of first order and have either pivotal or rolling fulcrums with means associated with said pendulum levers to actuate a rotatable indicator. Said bench lever and said pendulum levers are spaced from each other and require separate mountings.

One of the objects of the present invention is to provide a weighing scale having pendulum weighted levers for offsetting loads, said levers having their fulcrums mounted on a load-actuated lever and being movable therewith. These pendulum levers are of third order and have their power arms anchored in opposite directions so that an equal force is exerted above and below said load-actuated lever to maintain a normal balance thereof in relation to indicating means when the scale is out of level.

Another object of my invention is to provide a scale including a load-actuated lever and load-offsetting mechanism mounted on said lever and operatively associated therewith and means for actuating a rotatable indicator directly by said load-actuated lever.

Further objects of the invention are to provide an automatic weight indicating scale having a beam lever and weight indicating means operated thereby, said beam lever being provided with load offsetting levers fulcrumed on said beam lever and carried thereby, said load offsetting levers being anchored in opposite directions whereby an equal force is exerted against said main lever in opposite directions to maintain it in balance relatively to said indicating means when the scale occupies out-of-level position.

Still further objects of the invention are to provide an automatic weight indicating scale having a load-actuated lever of first order and a weight indicator mounted thereon, said load-actuated lever having pivotally mounted thereon to each side of its fulcrum a load offsetting pendulum weighted lever of third order, the power arms of said load-offsetting levers being anchored in opposite directions above and below said load-actuated lever whereby equal force is exerted against the last-mentioned lever in opposite directions so that it is maintained in normal balance relatively to said indicating member even when said scale occupies out-of-balance position.

With these and other objects in view, my invention consists in certain novel features of construction and arrangement of parts, hereinafter more fully described and claimed, and illustrated in the accompanying drawings, in which—

Figure 1 is a front elevational view of my improved scale, partly broken away.

Figure 2 is a side elevational view thereof.

Figure 3 is an enlarged front elevation of the upper end of the scale with parts thereof broken away to more clearly show the scale mechanism and the indicating means.

Figure 4 is a vertical cross section taken on line 4—4 of Figure 3.

Figure 5 is a view similar to Figure 3 but showing the parts in moved positions.

Figure 6 is an enlarged vertical cross section taken on line 6—6 of Figure 3.

Figure 7 is an enlarged vertical cross section taken on line 7—7 of Figure 3.

Figure 8 is a detail view showing means for anchoring the power end of one of the pendulum weighted levers.

Figure 9 is a horizontal cross section taken on line 9—9 of Figure 8.

In the drawings, my invention is shown as applied to a platform scale having a platform 10, an upwardly projecting casing 11, a housing 12 arranged on said casing, and a weight indicating casing 13 superposed on said housing 12.

The platform 10 is supported by any suitable mechanism (not shown) and is operatively connected to a beam lever or bench lever 14 by a steelyard 15. Said beam lever 14 is disposed in housing 12 and steelyard 15 which is connected at its lower end to said platform supporting mechanism extends upwardly through casing 11 into housing 12 and is operatively connected to said beam lever 14 by a shackle 16.

The housing 12 is formed box-shape and includes bottom wall 12a and top wall 12b. The top walls are formed with openings 17 which are adapted to be closed by removable plates 18.

Beam lever 14 which is a lever of first order is fulcrumed in said housing 12 by means of a casting 19 which is secured to bottom wall 12a and has upwardly projecting arms 20, the upper ends of which are bifurcated and have secured therein bearing blocks 21. These bearing blocks have upwardly presented V-shaped grooves supporting the knife edge ends of a fulcrum member 22 which is fixed to beam lever 14.

Preferably said beam lever 14 consists of two spaced side members 14a united together at their ends, as indicated at 14b, and the fulcrum member 22 extends between said side members and has its knife edge ends projecting laterally therefrom. Thus said lever 14 is pivotally mounted in housing 12 between arms 20.

Suspended from the knife-edge member 24 secured to beam 14 is the V-block 26 carried by the upper end of shackle 16. The upper end of steelyard 15 is provided with a hook which engages the eye formed in the lower end of said shackle. In this manner operating connection is established between the load platform 10 and the beam or main lever 14 so that the latter is actuated in accordance with the load placed on said platform.

The beam lever 14 is maintained in balance by load-offsetting means comprising a pair of pendulum weighted levers 27 carried by said beam lever 14 and arranged one at each side of fulcrum 22 thereof.

As shown, said pendulum levers 27 are levers of third order and have rolling fulcrums comprising tapes 29 and eccentrics or cams 30. Each eccentric is carried by a horizontally disposed shaft 31 arranged between said members 14a and having its ends journaled in ball bearings 32, mounted in said side members. A casting 34 is clamped or otherwise secured to each shaft 31. A pendulum 35 is attached to each casting 34 by a screw-threaded rod 36, one end of which is screw-seated in said casting and the other or lower end of which carries said pendulum. Nuts 37 are arranged on each rod adjacent to each side thereof to lock it in position.

Each eccentric 30 is loosely mounted on its corresponding shaft 31 and is held in fixed relation therewith by means of adjusting screws 38. These screws which are disposed in opposed relation are screw-seated in extensions 34a formed integral with casting 34 and extending therefrom in a direction opposite to eccentric 30. The opposed ends of each pair of screws engage the opposite sides of an extension 30a formed integral with said eccentric and projecting therefrom between extensions 34a. By adjusting said screws 38 in proper direction said eccentric can be accurately positioned on its shaft.

The left hand tape (as viewed in Fig. 3) is attached at its lower end to the left hand eccentric 30, passes partially around the lower peripheral portion of said eccentric and then extends upwardly above lever 14 and outwardly from housing 12 through an aperture formed in the top wall 12b thereof and is anchored by means of a bracket 40 which is fixed to said top wall 12b and extends into casing 13.

The other tape 29 is attached at one end to the other eccentric near the uppermost portion thereof as indicated at 41 and then passes over the upper portion of said eccentric downwardly below lever 14 and is secured or anchored to a bracket 42 which is fixed to the bottom wall 12a of housing 12.

Thus the end of power arm of one of the weighted levers 27 is anchored above lever 14 and the end of the power arm of the other weighted lever 27 is anchored below said lever 14. These weighted levers 27 are so arranged on lever 14 that when the latter is actuated by the load placed on platform 10, said levers 27 are operated to swing the pendulums or weights 35 outwardly away from each other.

The pendulums 35 of weighted levers 27 are so disposed that they never reach their vertical positions but always stop short thereof. Thus when beam lever 14 occupies its normal or home position, the normal or home positions of said pendulums 35 are as shown in Figure 3 with their respective axes inclined from vertical. The tendency of said pendulums is to move inwardly toward each other into vertical positions and thus they exert, through weights 27 and connections 29, a constant pull in opposite directions against said beam lever 14. The purpose of this arrangement is to stabilize said beam lever 14 and to maintain said flexible connections or tapes 29 taut at all times.

When beam lever 14 is actuated, as by placing a load on the platform 10, it is moved on its fulcrum and that arm of said lever connected to bracket 40 is moved downwardly and the other arm connected to bracket 42 is moved upwardly. This causes lengthening of the distances between the anchored ends of said tapes 29 and the axes of weighted levers 27, thereby causing the actuation of the latter (through tapes 29 and eccentrics 30) so that the pendulums 35 are swung outwardly (see Fig. 5). The extent of outward movement of said pendulums is in accordance with the load placed on said platform and the corresponding displacement of the beam lever 14.

As soon as the load is removed from the platform, pendulums 35 are free to swing inwardly and serve to restore the beam lever 14 to its normal position.

As stated before, eccentrics 30 are adjustable on their respective shafts 31 by means of adjusting screws 38. Additional adjustment is provided by adjustably anchoring the outer ends of tapes 29 to the respective brackets 40 and 42. This adjustment serves to take up slack in said tapes and also insures proper disposition of pendulums 35.

This adjustment is shown in Figures 8 and 9. Each outer end of the tape 29 is fixed to a plate 44 which is slidably and vertically mounted in a guide 45 formed in the upper end of each bracket. An adjusting screw 46 is screw-seated in each bracket in parallel spaced relation with the corresponding plate and one end of said screw bears against a horizontally disposed portion 44a formed integral with and projecting from said plate 44. Thus by turning the screw in proper direction, plate 44 is adjusted vertically to take up or release the corresponding tape and adjust the corresponding lever 27 and its pendulum.

A dashpot 47 is secured to the bottom wall 12a and operatively mounted therein is a piston (not shown) fixed to the lower end of a piston rod 48 which extends outwardly from said pot and is pivotally connected to the beam lever 14 as indicated at 49.

Two short rods 50 are fixed near the ends of the front side members 14a and extend horizontally and transversely therefrom through arcuate slots 51 formed in the front plate 18. These slots are formed concentric with the fulcrum of beam lever 14 and are sufficiently large to provide necessary clearance for said rods when said beam lever is actuated. A graduated bar 52 is fixed to the projecting ends of said rods and has slidably mounted thereon a counter poise 53 which operates in the usual manner.

A lock 54 is manually operable by a handle 55 and is used to lock said beam lever 14 in home position when not in use.

The casing 13 which is supported by and extends upwardly from beam lever housing 12 encloses weight indicating mechanism 56. This comprises a stationary chart 57 having arranged thereon a circular row of weight indicia 58 and an indicator 59 rotatably supported in said casing concentrically with said weight indicia.

The indicator 59 is fixed to one end of a horizontally disposed shaft 60 which projects outwardly through a central opening 57a formed in said chart member 57. Shaft 60 is journaled in ball bearing 61 carried in the upper end of a bracket 62 which latter is fixed to and extends upwardly from the top wall 12b of housing 12.

A pinion 64 is fixed to said shaft 61 and meshing with said pinion is a gear segment 65 which is carried by the upper end of an arm 66. The latter is fixed at 66a to beam lever 14 and extends radially therefrom with respect to the fulcrum thereof. Thus said gear segment 65 operates concentrically with the fulcrum of lever 14. This gear segment is preferably adjustably mounted in the upper end of arm 66 and is secured in adjusted position by a set screw 67' (see Fig. 7).

As shown in the drawings, the scale is preferably formed with weight indicating means on both sides of casing 13, there being two stationary charts 57 and two indicators 59 used, as clearly shown in Figure 7.

When lever 14 is actuated the arm 66 is rocked in the direction indicated by arrow in Figure 3, thereby imparting rotatable movement to indicator 59, as indicated by arrow in said figure. When lever 14 is restored to normal position the indicator 59 is also moved to zero position.

I claim:

1. In a weighing scale, a beam lever adapted to be actuated in accordance with the load placed on said scale, and a pair of pendulum weighted levers mounted on said beam lever for movement bodily therewith and also for oscillatory movement with respect to said beam lever one at each side of the fulcrum thereof and having their power arms anchored in opposite directions, whereby the operating movement of said beam lever is yieldingly resisted by gravity of said pendulum levers.

2. In a weighing scale, a beam lever adapted to be actuated in accordance with the load placed on said scale, pivotal mountings arranged on said beam scale to each side of the fulcrum thereof and in spaced relation therewith, a pendulum weighted lever mounted in each mounting for oscillatory movement, said pendulum weighted levers having their power arms anchored in opposite directions and having their load arms provided with pendulums whereby said pendulums move outwardly away from the fulcrum of said beam lever a predetermined distance in accordance with the load placed on said scale and restore by gravity said beam lever to its normal position when said load is removed.

3. In a weighing scale, a beam lever adapted to be actuated in accordance with a load placed on said scale, and load offsetting means operatively mounted on said beam lever and operable thereby in direct ratio to said load, said means comprising a pair of variable power arms mounted one at each side of the fulcrum of said beam lever, counterbalances, one connected to each power arm, said power arms being anchored in opposite directions relatively to each other whereby the actuation of said beam lever operates said power arms to move in opposed directions from their normal positions to cause said counterbalances to offset the load placed on said scale.

4. In a weighing scale, a lever of the first order, pendulum mountings on said lever arranged to each side of the fulcrum thereof, and a pair of pendulum weighted levers of the third order oscillatably mounted in said mountings, said beam lever being adapted to be actuated in accordance with the load placed on said scale and cause the pendulums of said weighted levers to move outwardly a distance necessary to offset said load.

5. In a scale of the class described, a beam lever adapted to be actuated by a load placed on said scale, a pair of pendulum weighted levers pivotally mounted on said beam lever at opposite sides of the fulcrum of the beam lever for oscillatory movement and operable in opposite directions by actuation of the beam lever when load is placed on the scale, and means operatively associated with said beam lever to indicate the value of the load placed on said scale.

6. In an automatic indicating scale, the combination of load offsetting means comprising a beam lever of the first order and a pair of pendulum weighted levers of the third order pivotally mounted on said beam lever in spaced relation with the fulcrum thereof, said beam lever being actuated by loads placed on said scale whereby said pendulum weighted levers are displaced from their normal positions to offset said load, and weight indicating means including a stationary chart member, an indicator operable relatively thereto, and means operatively associated with said beam lever for actuating said indicator in accordance with the load placed on said scale.

7. In an automatic weight indicating scale, the combination of a beam lever of the first order operable in accordance with the load placed on said scale, an arm fixed to said beam lever and extending therefrom radially, a stationary chart member provided with weight indicia, an indicator revolubly mounted concentrically with the weight indicia of said chart, means operatively associated with said arm and with said indicator for imparting revoluble motion thereto when said beam lever is actuated, and load offsetting means for said beam lever and comprising a pair of pendulum weighted levers of the third order pivotally mounted on said beam lever one to each side of the fulcrum thereof and having their power arms anchored in opposite directions whereby said beam lever is held in balanced position by the gravity of said pendulum weighted levers and the latter are displaced from their normal positions in accordance with said load actuated beam lever.

8. In a scale, a load responsive beam of the first order, a pair of counterweights, arms, one for carrying each counterweight, means for pivotally mounting the arms on the beam, one arm at each side of the beam fulcrum, to move bodily with the beam and to be capable of oscillatory movement with respect to the beam, and connections from said arms to parts of the scale relative to which the beam moves to cause oscillatory movement of the arms with respect to the beam as the beam rocks and carries the arms and counterweights bodily therewith away from said parts of the scale, one of said connections being to one arm and extending upwardly while the other of said connections is to the other arm and extends downwardly whereby the arms are caused to rock in opposite directions when the beam rocks in any one direction.

9. In a scale, a load responsive beam of the first order, a pair of pendulum weighted power sectors pivotally mounted on the beam, one at each side of the fulcrum of the beam, to move bodily with the beam and to be capable of oscillatory movement with respect to the beam, a tape connection wound on one power sector and extending upwardly therefrom to be anchored to a fixed part of the scale, and another tape connection wound on the other power sector and extending downwardly therefrom to be anchored to a fixed part of the scale, said connections causing rocking of the power sectors in opposite directions with respect to the beam as the latter rocks relative to said fixed scale parts and carries the sectors bodily away from said fixed parts.

10. In a scale, a load responsive beam of the first order, a pair of pendulum weights, supports, one for each of the weights and each including a cam-shaped power sector rigid with the weight, means for pivotally mounting said supports on the beam, one support at each side of the beam fulcrum, to move bodily with the beam and to be capable of oscillatory movement with respect to the beam, a tape connection extending upwardly from one sector to a fixed part of the scale, another tape connection extending downwardly from the other power sector to a fixed part of the scale, said connections causing the rocking of the supports, power sectors, and pendulums in opposite directions as the beam rocks relative to said fixed parts and carries the pendulum assemblies bodily therewith away from said fixed parts, and a load indicator controlled by said beam, the rocking of the pendulum assemblies due to the cam shape of the sectors causing the indicator to move equal distances for equal increments of load.

HARRY C. SCHAPER.